United States Patent
De Luca et al.

(10) Patent No.: US 6,737,785 B2
(45) Date of Patent: May 18, 2004

(54) METHOD AND APPARATUS FOR SEALING AN INNER DIAMETER OF A SEGMENTED STATOR

(75) Inventors: Kenneth M De Luca, O'Fallon, IL (US); Charles P. Ketterer, Fenton, MO (US); James E. McDonald, Collinsville, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/151,428

(22) Filed: May 20, 2002

(65) Prior Publication Data

US 2003/0214197 A1 Nov. 20, 2003

(51) Int. Cl.$^7$ .................................................. H02K 1/28
(52) U.S. Cl. .................. 310/218; 310/214; 310/215; 310/88; 310/259
(58) Field of Search ........................ 310/218, 214, 310/215, 216, 217, 203, 88, 258, 259, 89

(56) References Cited

U.S. PATENT DOCUMENTS

| | | | | |
|---|---|---|---|---|
| 4,994,700 A | * | 2/1991 | Bansal et al. | 310/215 |
| 6,121,708 A | * | 9/2000 | Muller | 310/214 |
| 6,202,285 B1 | * | 3/2001 | Bell | 29/596 |
| 6,274,962 B1 | * | 8/2001 | Kliman | 310/261 |
| 2002/0074889 A1 | * | 6/2002 | Kikuchi et al. | 310/214 |
| 2002/0130573 A1 | * | 9/2002 | Kikuchi et al. | 310/91 |

FOREIGN PATENT DOCUMENTS

| | | |
|---|---|---|
| EP | 0871282 A1 | 10/1998 |
| EP | 1128524 A2 | 8/2001 |
| WO | 95/12912 | 5/1995 |

* cited by examiner

*Primary Examiner*—Thanh Lam
(74) *Attorney, Agent, or Firm*—Harness, Dickey & Pierce, P.L.C.

(57) ABSTRACT

An electric machine includes a stator with a plurality of circumferentially-spaced stator segment assemblies. A rotor rotates relative to the stator and defines an airgap between an outer diameter of the rotor and the inner diameter of the stator. Each stator segment assembly includes a stator segment core, an endcap that is attached to the stator segment core, and winding wire that is wound around the endcap and the stator segment core. The endcap provides first and second axial mating surfaces. The endcaps provide first and second circumferential surfaces on opposite axial ends thereof. First and second annular seals engage the first and second circumferential surfaces to provide circumferential seals at opposite axial ends of the stator. The annular seals, the axial seals and the circumferential seals prevent the entry of debris into the airgap.

38 Claims, 5 Drawing Sheets

METHOD AND APPARATUS FOR SEALING AN INNER DIAMETER OF A SEGMENTED STATOR

FIELD OF THE INVENTION

The present invention relates to electric machines, and more particularly to electric machines with segmented stators.

BACKGROUND OF THE INVENTION

Electric machines such as motors and generators include a rotor that is a rotating member of the electric machine and a stator that is a stationary member of the electric machine. In some applications, the rotor is rotatably mounted inside of the stationary stator. An air gap is defined between a radially outer surface of the rotating rotor and a radially inner surface of the stationary stator. When debris falls into the air gap, a locked rotor condition may occur.

Manufacturers sometimes integrate the electric machines into larger systems. Debris may enter the air gap during assembly of the electric machine and/or during use in the field. Some manufacturers specify strict cleanliness standards during the assembly process. In addition, manufacturers also require sealed stator and rotor packages that prevent the locked rotor condition.

There are several conventional methods for preventing debris from entering the airgap during assembly and subsequent use in the field. During the assembly process, the electric machine manufacturer strictly enforces cleanliness specifications and performs visual inspections of the electric machines after assembly. A stator varnish and bake system may also be employed. Plastic encapsulation and resin potting have also been employed.

All of the conventional methods generally increase the time that is required to manufacture the electric machine, which increases the cost of the electric machine. In addition, the final three conventional methods described above typically require a significant amount of capital investment. The conventional solutions become less economical when the electric machine includes a segmented stator. The handling of each of the stator segments during varnish, plastic encapsulation or resin potting increase processing expense. In some applications, only one end of the stator is open, which makes it difficult or impossible to generate enough pressure to overmold or resin pot the entire stator or to ensure that enough varnish covers the closed end of the motor.

SUMMARY OF THE INVENTION

An electric machine according to the present invention includes a stator with a plurality of circumferentially-spaced stator segment assemblies. Each stator segment assembly includes a stator segment core, an endcap that is attached to the stator segment core, and winding wire that is wound around the endcap and the stator segment core. The endcap provides first and second axial mating surfaces. A rotor rotates relative to the stator and defines an airgap between an outer diameter of the rotor and the inner diameter of the stator. The first axial mating surface of one stator segment assembly mates with the second axial mating surface of an adjacent stator segment assembly to provide axial seals that prevent entry of debris into the airgap.

In other features of the invention, the endcaps provide first and second circumferential end surfaces on axially opposite ends of the stator segment assemblies. First and second annular seals bias the first and second circumferential end surfaces to provide circumferential seals at axially opposite ends of the stator. The annular seals, the axial seals and the circumferential seals cooperate to prevent the entry of debris into the airgap.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
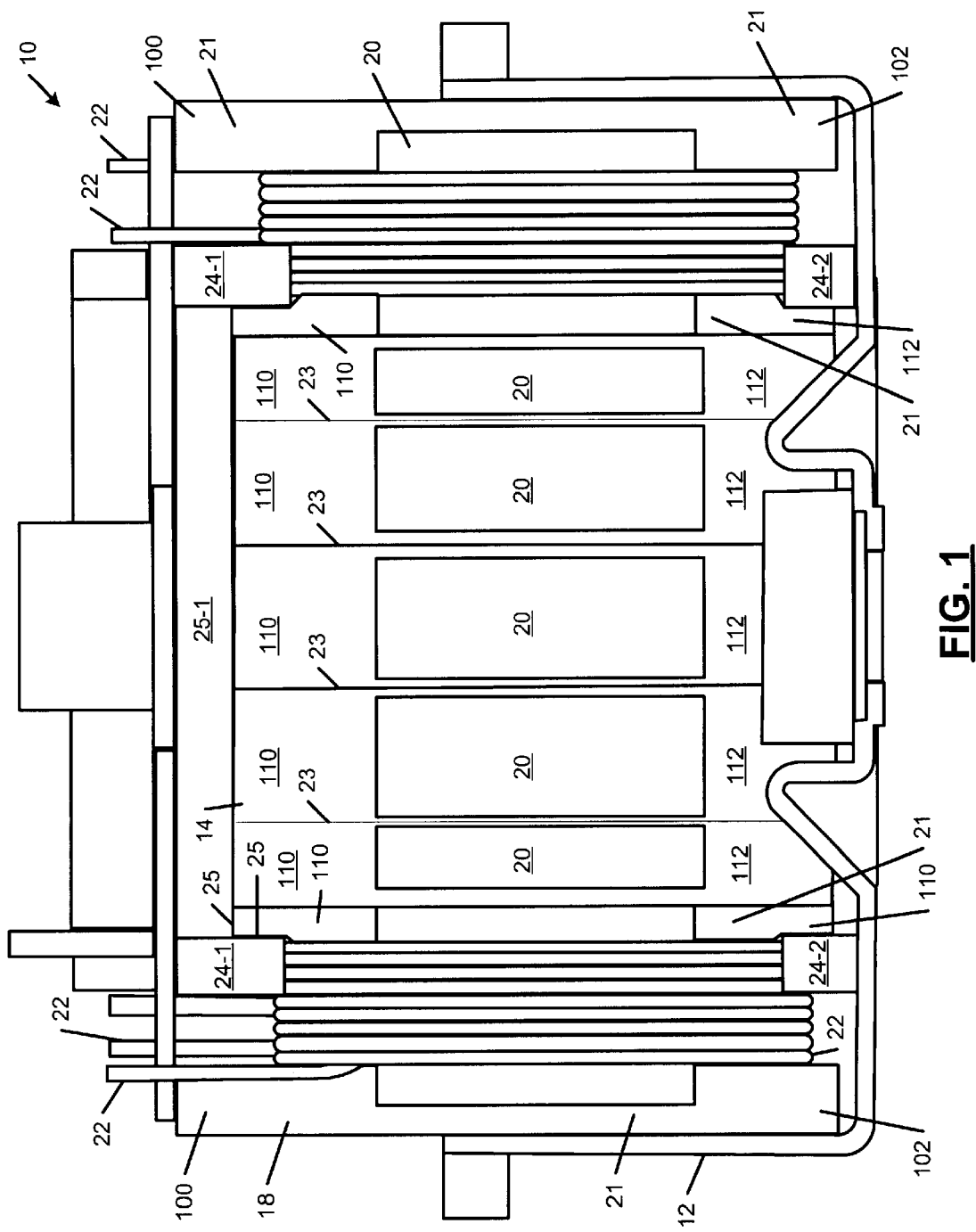
FIG. 1 is an axial cross section of an electric machine with a rotor removed and a stator having a sealed inner diameter according to he present invention.
Figure 2:
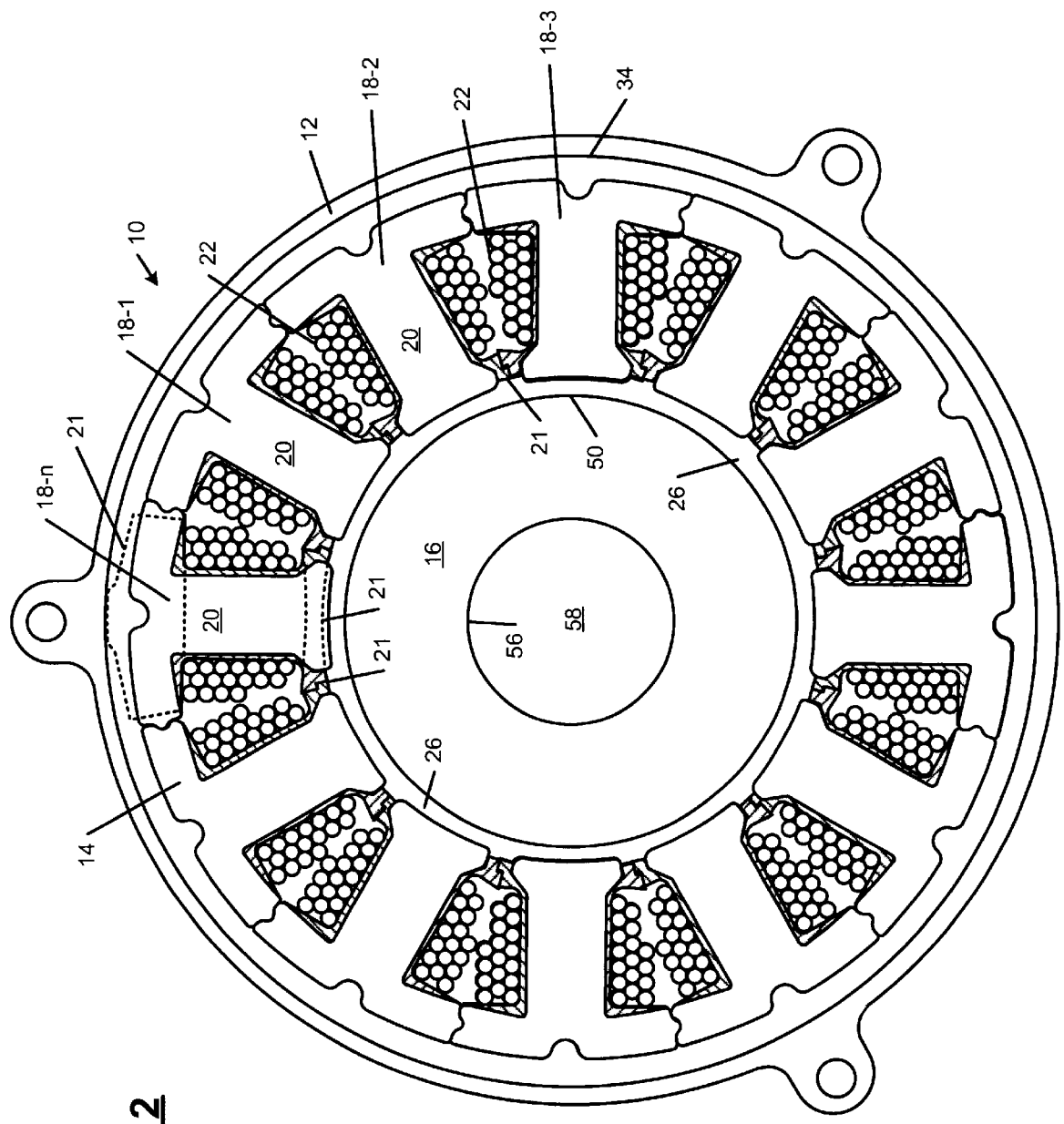
FIG. 2 is a partial radial cross section of the electric machine according to the present invention.

Referring now to FIGS. 1 and 2, an electric machine 10 includes a housing 12 and a segmented stator 14 mounted in the housing 12. A rotor 16 is supported for rotation relative to the stationary segmented stator 14. The segmented stator 14 includes a plurality of stator segment assemblies 18-1, 18-2, ..., and 18-n (sometimes generally identified by 18). The stator segment assemblies 18 are individually assembled and then combined with additional stator segment assemblies 18 to provide the stator 14.

Each stator segment assembly 18 includes a stator segment core 20. An endcap 21 is attached to the stator segment core 20. Winding wire 22 is wound around the stator segment core 20 and the endcap 21. The endcaps 21 project axially along the stator segment assemblies to provide an axial seal 23 between adjacent stator segment assemblies 18. Annular seals 24-1 and 24-2 interface with ends of the endcaps 21 to provide circumferential seals 25. The axial seals 23, annular seals 24 and circumferential seals 25 prevent debris that can cause a locked rotor position from entering an airgap 26 between the stator 14 and the rotor 16.

Figure 3:
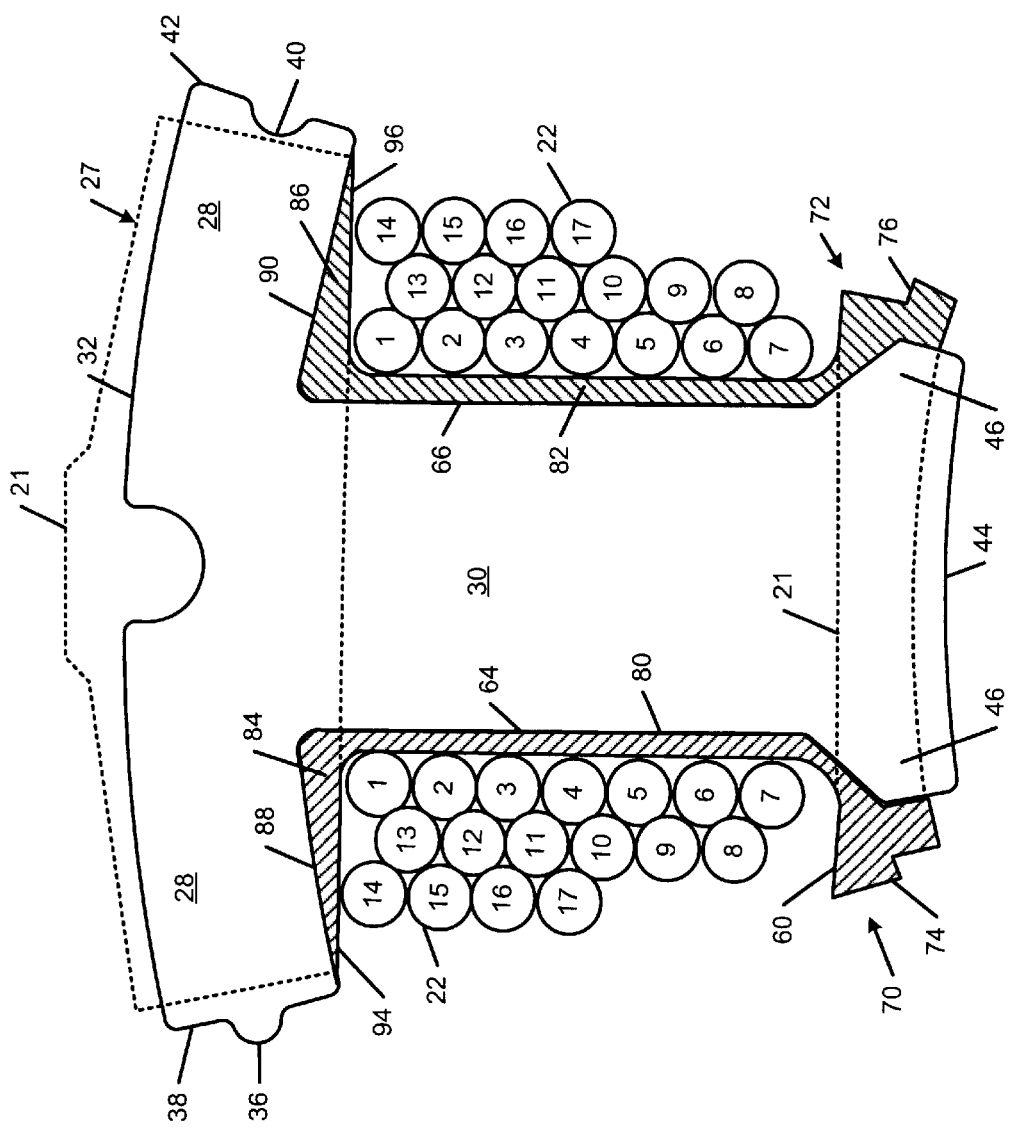
FIG. 3 is a partial radial cross section of a stator segment assembly.

Referring now to FIG. 3, the stator segment core 20 includes a solid core or a stack of individual stator plates 27. Each stator plate 27 includes an arcuate outer rim section 28 and a tooth-shaped pole section stator 30. An outer edge surface 32 of the outer rim section 28 is generally arcuate. Each outer rim section 28 has an optional tongue projection 36 formed on one edge surface 38 and a groove 40 on its opposite edge surface 42. The tongue and groove arrangement helps align the stator segment assemblies during assembly. Each tooth-shaped pole section 30 of the stator plates 27 has an arcuate inner edge surface 44 and a pair of circumferentially-extending projections 46.

The stator plates 27 are preferably die cut from thin sheets of magnetically conductive material, although other methods of forming the stator plates 27 may be used. During the die cutting operation, a first pair of slits (not shown) may be cut into the outer rim section 28 and a second pair of slits (not shown) may be cut into the pole section 30. The first pair of slits may be transverse in alignment relative to the second pair of slits. After stacking the stator plates 27 that form the stator segment core 20, a die punch operation is completed to deform a central portion between the first and second pairs of slits. This operation results in the stator plates 27 being releasably interconnected to define the stator segment core 20. The rotor 16 typically includes a plurality of permanent magnet pole sections (not shown) on an outer surface 54 of the rotor 16. However, skilled artisans will appreciate that the present invention has application to other types of electric machines such as switched reluctance electric machines. A circular bore 56 (FIG. 2) is formed in the rotor 16 and typically includes keyways (not shown). The circular bore 56 of the rotor 16 receives a rotor shaft 58.

Referring back to FIG. 3, each stator segment assembly 18 includes the endcap 21 that is attached and/or formed around the stator segment core 20. The endcap 21 is located between the winding wire 22 and opposite outer wall surfaces 64 and 66 of the tooth-shaped pole section stator. The endcap 21 includes radially-inner ends 70 and 72 that project circumferentially and that define mating surfaces 74 and 76. While generally "Z"-shaped mating surfaces are shown in the exemplary embodiment in FIG. 3, the mating surfaces 74 and 76 may have other shapes and/or profiles.

The endcap 21 includes center sections 80 and 82 that extend in a radial direction along the opposite outer wall surfaces 64 and 66 of the tooth-shaped pole section 30. Radially outer ends 84 and 86 of the endcap 21 project in opposite circumferential directions and lie adjacent to radially inner edges 88 and 90 of the outer rim section 28. Radially inner edges 94 and 96 of the radially outer ends 84 and 86 preferably provide a surface that is generally perpendicular to opposite outer wall surfaces 64 and 66 of the tooth-shaped pole section 30 to improve the winding process.

Figure 4:
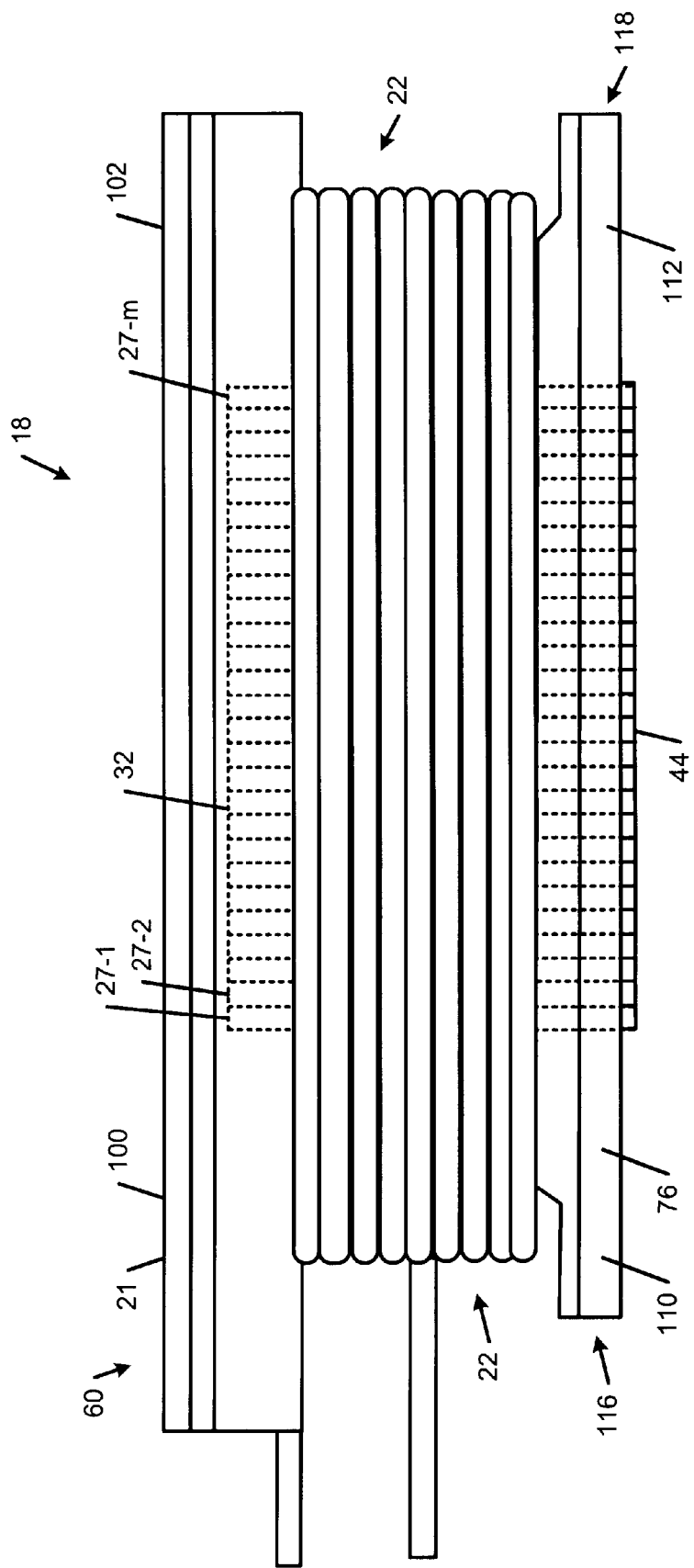
FIG. 4 is a side view of a stator segment assembly.

Referring now to FIG. 4, the stator segment assembly 18 is illustrated in further detail. The stator segment core 20 includes the stack of stator plates 27-1, 27-2, . . . , 27-n that are encapsulated by the endcap 21. The winding wire 22 is would around the endcap 21 and the stack of stator plates 27. Radially outer ends 100 and 102 of the endcap 21 project in opposite axial directions beyond the stator plates 27. The outer edge surface 32 of the stator plates 27 is encapsulated by the endcap 21. Radially inner ends 110 and 112 of the endcap 21 project in opposite axial directions and extend axially beyond the stator plates 27. The arcuate inner edge surface 44 of the stator plates 27 extends slightly outside of the endcap 21 in a radially inward direction to provide magnetic coupling between the stator segment core 20 and the rotor 16. One or more surfaces near axial ends 116 and 118 interface with the annular seals 24 to provide the circumferial seal 25.

Figure 5:
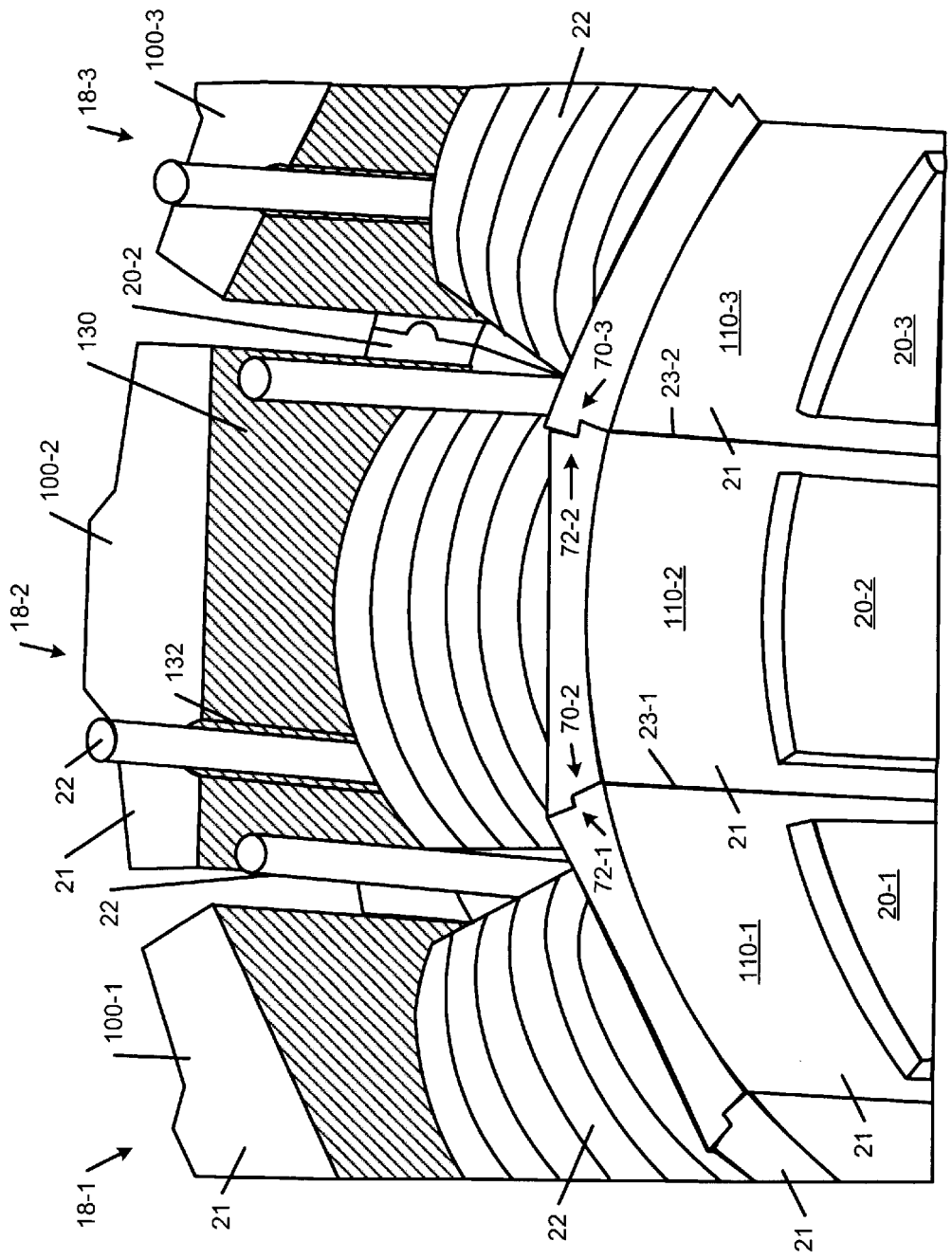
FIG. 5 is an isometric view of multiple stator segment assemblies in an assembled relationship.

Referring now to FIG. 5, an isometric view of multiple stator segment assemblies 18 is shown. For purposes of clarity, reference numerals from FIGS. 1–4 are used in FIG. 5 to identify similar elements. As can be appreciated, a second mating surface 72-1 of a first stator segment assembly 18-1 engages a first mating surface 70-2 of a second stator segment assembly 18-2 to provide the axial seal 23-1. Likewise, a second mating surface 72-2 of the second stator segment assembly 18-2 and engages a first mating surface 70-3 of a third stator segment assembly 18-3 to provide the axial seal 23-2. Radially inner surfaces 130 of the radially outer end 100 of the endcap 21 may optionally include winding wire positioning channels 132.

Referring back to FIG. 1, the annular seals 24-1 and 24-2 are compressed during assembly by the housing 12, a circuit board (not shown), the winding wire 22 and/or the axial ends 116 and 118 of the inner ends 110 and 112 of the endcap 21 to provide the circumferential seals 25 at opposite ends of the stator 14. The axial seals 23 are provided between adjacent stator segment assemblies 18 by the mating surfaces 70 and 72. As a result, the present invention prevents debris, which is capable causing a locked rotor condition, from entering the airgap 26.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An electric machine including a stator having a sealed inner diameter, comprising:

a stator including a plurality of circumferentially-spaced stator segment assemblies each including:

a stator segment core;

an endcap that is attached to said stator segment core; and winding wire that is wound around said endcap and said stator segment core, wherein said endcap provides first and second axial mating surfaces; and a rotor that rotates relative to said stator and that defines an airgap between an outer diameter of said rotor and said inner diameter of said stator, wherein said first axial mating surface of one stator segment assembly mates with said second axial mating surface of an adjacent stator segment assembly to provide axial seals between said stator segment assemblies and to prevent the entry of debris into said airgap.

2. The electric machine of claim 1 wherein said endcap provides first and second circumferential end surfaces on opposites axial ends thereof.

3. The electric machine of claim 2 further comprising first and second annular seals that engage said first and second circumferential end surfaces of said endcaps to provide circumferential seals at opposite axial ends of said stator.

4. The electric machine of claim 3 wherein said annular seals, said axial seals and said circumferential seals prevent the entry of debris into said airgap.

5. The electric machine of claim 3 wherein said annular seal is formed of a flexible material.

6. The electric machine of claim 3 wherein said axial seals between said stator segment assemblies extend between said opposite circumferential seals.

7. The electric machine of claim 1 wherein said electric machine is a switched reluctance machine.

8. The electric machine of claim 1 wherein said endcaps are formed of a dielectric material.

9. The electric machine of claim 1 wherein said electric machine is a permanent magnet machine.

10. The electric machine of claim 1 wherein said first and second axial mating surfaces have a generally "Z"-shaped cross section.

11. An electric machine including a stator having a sealed inner diameter, comprising:
a stator including a plurality of circumferentially-spaced stator segment assemblies each including:
a stator segment core;
an endcap that is attached to said stator segment core; and
winding wire that is wound around said endcap and said stator segment core, wherein said endcaps provide first and second circumferential end surfaces on axially opposite ends of said endcap;
a rotor that rotates relative to said stator and that defines an airgap between an outer diameter of said rotor and said inner diameter of said stator; and
first and second annular seals that engage said first and second circumferential end surfaces to provide circumferential seals at axially opposite ends of said stator.

12. The electric machine of claim 11 wherein said endcap further provides first and second axial mating surfaces, wherein said first axial mating surface of one stator segment assembly mates with said second axial mating surface of an adjacent stator segment assembly to provide axial seals.

13. The electric machine of claim 12 wherein said annular seals, said axial seals and said circumferential seals prevent debris from entering said airgap.

14. The electric machine of claim 12 wherein said first and second axial mating surfaces have a generally "Z"-shaped cross section.

15. The electric machine of claim 12 wherein said axial seals between said stator segment assemblies extend between said opposite circumferential seals.

16. The electric machine of claim 11 wherein said annular seal is formed of a flexible material.

17. The electric machine of claim 11 wherein said electric machine is a switched reluctance machine.

18. The electric machine of claim 11 wherein said endcaps are formed of a dielectric material.

19. The electric machine of claim 11 wherein said electric machine is a permanent magnet machine.

20. A method for preventing debris from entering an airgap between a rotor and a stator of an electric machine, comprising:
segmenting a stator into a plurality of stator segment assemblies;
forming an endcap on a stator segment core of said stator segment assemblies;
defining first and second axial mating surfaces on said endcap; and
mating said first axial mating surface of one stator segment assembly with said second axial mating surface of an adjacent stator segment assembly to provide axial seals between said stator segment assemblies.

21. The method of claim 20 further comprising defining first and second circumferential end surfaces on axially opposites ends of said endcaps.

22. The method of claim 21 further comprising providing first and second annular seals that engage said first and second circumferential end surfaces to provide circumferential seals at opposite axial ends of said stator.

23. The method of claim 22 wherein said annular seals, said axial seals and said circumferential seals prevent the entry of debris into said airgap.

24. The method of claim 22 wherein said first and second annular seals are formed of a flexible material.

25. The method of claim 20 wherein said electric machine is a switched reluctance machine.

26. The method of claim 20 wherein said endcaps are formed of a dielectric material.

27. The method of claim 20 wherein said electric machine is a permanent magnet machine.

28. The method of claim 20 wherein said first and second axial mating surfaces have a generally "Z"-shaped cross section.

29. The method of claim 20 wherein said axial seals between said stator segment assemblies extend between said opposite circumferential seals.

30. A method for preventing debris from entering an airgap between a rotor and a stator of an electric machine, comprising:
circumferentially segmenting a stator into a plurality of stator segment assemblies;
forming an endcap around a stator segment core of said stator segment assemblies;
defining first and second circumferential end surfaces on axially opposites ends of said endcaps; and
providing first and second annular seals that engage said first and second circumferential end surfaces to provide circumferential seals at opposite axial ends of said stator.

31. The method of claim 30 further comprising:
defining first and second axial mating surfaces on said endcap; and
mating said first mating surface of one stator segment assembly with said second axial mating surfaces of an adjacent stator segment assembly to provide axial seals between said stator segment assemblies.

32. The method of claim 31 wherein said annular seals, said axial seals and said circumferential seals prevent the entry of debris into said airgap.

33. The method of claim 31 wherein said first and second axial mating surfaces have a generally "Z"-shaped cross section.

34. The method of claim 31 wherein said axial seals between said stator segment assemblies extend between said opposite circumferential seals.

35. The method of claim 30 wherein said first and second annular seals are formed of a flexible material.

36. The method of claim 30 wherein said electric machine is a switched reluctance machine.

37. The method of claim 30 wherein said endcaps are formed of a dielectric material.

38. The method of claim 30 wherein said electric machine is a permanent magnet machine.

* * * * *